(12) United States Patent
Westerman et al.

(10) Patent No.: US 10,488,986 B2
(45) Date of Patent: Nov. 26, 2019

(54) TOUCH REJECTION

(71) Applicant: Apple Inc., Cupertino, CA (US)

(72) Inventors: Wayne Carl Westerman, Burlingame, CA (US); Ari Y. Benbasat, San Jose, CA (US)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 15/710,087

(22) Filed: Sep. 20, 2017

(65) Prior Publication Data

US 2018/0024693 A1    Jan. 25, 2018

Related U.S. Application Data

(62) Division of application No. 14/284,339, filed on May 21, 2014, now Pat. No. 9,778,789.

(51) Int. Cl.
*G06F 3/041* (2006.01)
*G06F 3/044* (2006.01)

(52) U.S. Cl.
CPC .......... *G06F 3/0418* (2013.01); *G06F 3/044* (2013.01)

(58) Field of Classification Search
CPC ..................................... G06F 3/044
USPC ....................................... 345/173
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,294,686 B2 | 10/2012 | Townsend et al. |
| 8,479,122 B2 | 7/2013 | Hotelling et al. |
| 8,531,425 B2 | 9/2013 | Westerman |
| 2006/0197753 A1 | 9/2006 | Hotelling |
| 2009/0095540 A1 | 4/2009 | Zachut et al. |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Stephen T. Reed
(74) *Attorney, Agent, or Firm* — Kubota & Basol LLP

(57) ABSTRACT

The rejection of undesired touch events on a touch surface is disclosed. A weighted meta-centroid of all touch events can be computed. In some examples, touches can be weighted inversely to their size and distance to the nearest neighboring touch. In some examples, touches can be weighted based on the size of their minor radii. A meta-ellipse can be fit to the weighted touch events. In some examples, the major axis of the meta-ellipse can be used to determine the orientation of a user's hand to reject undesired touches. In other examples, touches within the meta-ellipse can be rejected.

27 Claims, 12 Drawing Sheets

(56) References Cited

U.S. PATENT DOCUMENTS

| | | |
|---|---|---|
| 2010/0073301 A1 | 3/2010 | Yousefpor et al. |
| 2013/0016045 A1 | 1/2013 | Zhao et al. |
| 2013/0300672 A1 | 11/2013 | Griffin |
| 2013/0300696 A1 | 11/2013 | Haran et al. |
| 2015/0338991 A1 | 11/2015 | Westerman et al. |
| 2016/0098148 A1 | 4/2016 | Gandra et al. |

OTHER PUBLICATIONS

Non-Final Office Action dated Jan. 30, 2017, for U.S. Appl. No. 14/284,339, filed May 21, 2014, ten pages.
Notice of Allowance dated Jun. 30, 2017, for U.S. Appl. No. 14/284,339, filed May 21, 2014, five pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

TOUCH REJECTION

CROSS-REFERENCE TO RELATED APPLICATIONS

This application is a divisional of U.S. patent application Ser. No. 14/284,339 (now U.S. Publication No. 2015-0338991), filed on May 21, 2014, the entire disclosure of which is incorporated herein by reference for all purpose.

FIELD OF THE DISCLOSURE

This relates to touch sensor panels used as input devices for computing systems, and more particularly, to techniques for rejecting undesired touch events on the touch sensor panel.

BACKGROUND OF THE DISCLOSURE

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus, or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

As touch sensing technology continues to improve, touch sensitive devices are increasingly being used in environments where the orientation of a user's hand or other objects relative to the device is unknown to the device. For example, a user's hand or a stylus can interact with a touch-sensitive device irrespective of the orientation of the device. Touch processing performance to remove undesired touch events can degrade if the orientation of the user's hand or an object is substantially different than the orientation expected by the device.

SUMMARY OF THE DISCLOSURE

This relates to the rejection of undesired touch events on a touch surface. A weighted meta-centroid of all touch events can be computed. In some examples, touches can be weighted inversely to their size and distance to the nearest neighboring touch. In some examples, touches can be weighted based on the size of their minor radii. A meta-ellipse can be fit to the weighted touch events. In some examples, the major axis of the meta-ellipse can be used to determine the orientation of a user's hand to reject undesired touches. In other examples, touches within the meta-ellipse can be rejected.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to the rejection of undesired touch events on a touch surface. A weighted meta-centroid of all touch events can be computed. In some examples, touches can be weighted inversely to their size and distance to the nearest neighboring touch. In some examples, touches can be weighted based on the size of their minor radii. A meta-ellipse can be fit to the weighted touch events. In some examples, the major axis of the meta-ellipse can be used to determine the orientation of a user's hand to reject undesired touches. In other examples, touches within the meta-ellipse can be rejected.

Figure 1:
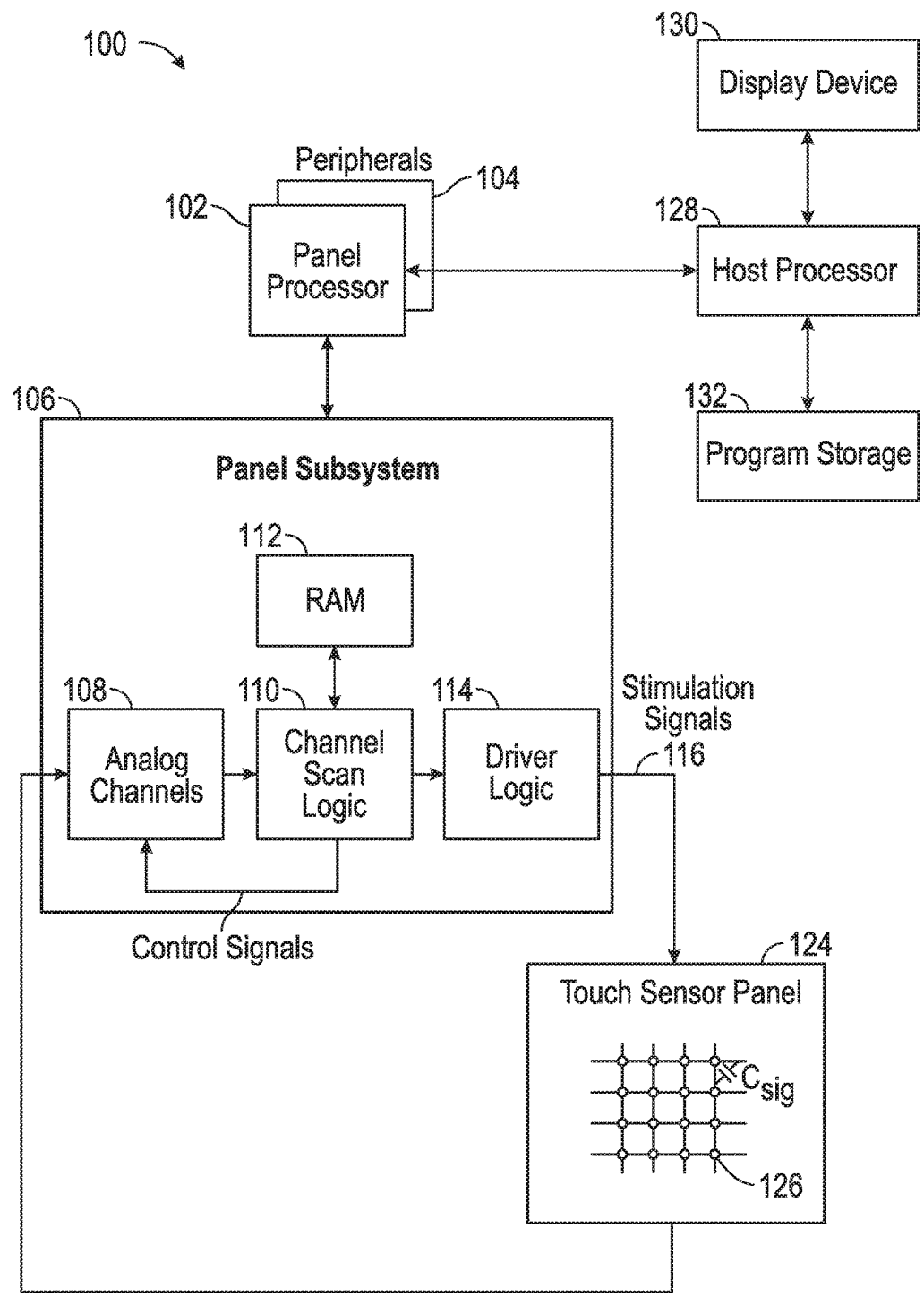
FIG. 1 illustrates an exemplary computing system capable of implementing an algorithm for determining orientation and/or rejecting touch events according to examples of the disclosure.

FIG. 1 illustrates an exemplary computing system capable of implementing an algorithm for determining orientation and/or rejecting touch events according to examples of the disclosure. Computing system 100 can include one or more panel processors 102, which can execute software or firmware implementing the algorithm for rejecting touch events according to examples of the disclosure, peripherals 104, and panel subsystem 106. Peripherals 104 can include, but are not limited to, random access memory (RAM) or other types of memory or storage, watchdog timers and the like. Panel subsystem 106 can include, but is not limited to, one or more sense channels 108, channel scan logic (analog or digital) 110 and driver logic (analog or digital) 114. Channel scan logic 110 can access RAM 112, autonomously read data from sense channels 108 and provide control for the sense channels. In addition, channel scan logic 110 can control driver logic 114 to generate stimulation signals 116 at various phases that can be simultaneously applied to drive lines of touch sensor panel 124. In some examples, panel subsystem 106, panel processor 102 and peripherals 104 can be integrated into a single application specific integrated circuit (ASIC).

Touch sensor panel 124 can include a capacitive sensing medium having a plurality of drive lines and a plurality of sense lines, although other sensing media can also be used. The drive and sense lines can be formed from a transparent conductive medium such as Indium Tin Oxide (ITO) or Antimony Tin Oxide (ATO), although other transparent and non-transparent materials such as copper can also be used. The drive and sense lines can be formed on a single side of a substantially transparent substrate, on opposite sides of the substrate, or on two separate substrates separated by the dielectric material. Each intersection of drive and sense lines can represent a capacitive sensing node and can be viewed as picture element (pixel) 126, which can be particularly useful when touch sensor panel 124 is viewed as capturing an "image" of touch. (In other words, after panel subsystem 106 has determined whether a touch event has been detected at each touch sensor in the touch sensor panel, the pattern of touch sensors in the multi-touch panel at which a touch event occurred can be viewed as an "image" of touch (e.g., a pattern of fingers touching the panel).) The capacitance between the drive and sense lines and local system ground can appear as a stray capacitance Cstray and the capacitance at the intersections of the drive and sense lines, i.e., the touch nodes, as a mutual signal capacitance Csig when the given drive line is stimulated with an alternating current (AC) signal. The presence of a finger or other object near or on the touch sensor panel can be detected by measuring changes to a signal charge present at the nodes being touched, which can be a function of Csig. Each sense line of touch sensor panel 124 can drive sense channel 108 in panel subsystem 106. Touch sensor panel 124 can cover a portion or substantially all of a surface of a device.

Computing system 100 can also include host processor 128 for receiving outputs from panel processor 102 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can execute software or firmware implementing the algorithm for determining orientation and/or rejecting touch events according to examples of the disclosure. Host processor 128 can also perform additional functions that may not be related to panel processing, and can be coupled to program storage 132 and display device 130 such as an LCD display for providing a UI to a user of the device. Display device 130 together with touch sensor panel 124, when located partially or entirely under the touch sensor panel, can form a touch screen.

Note that one or more of the functions described above can be performed by firmware stored in memory (e.g. one of the peripherals 104 in FIG. 1) and executed by panel processor 102, or stored in program storage 132 and executed by host processor 128. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 2:
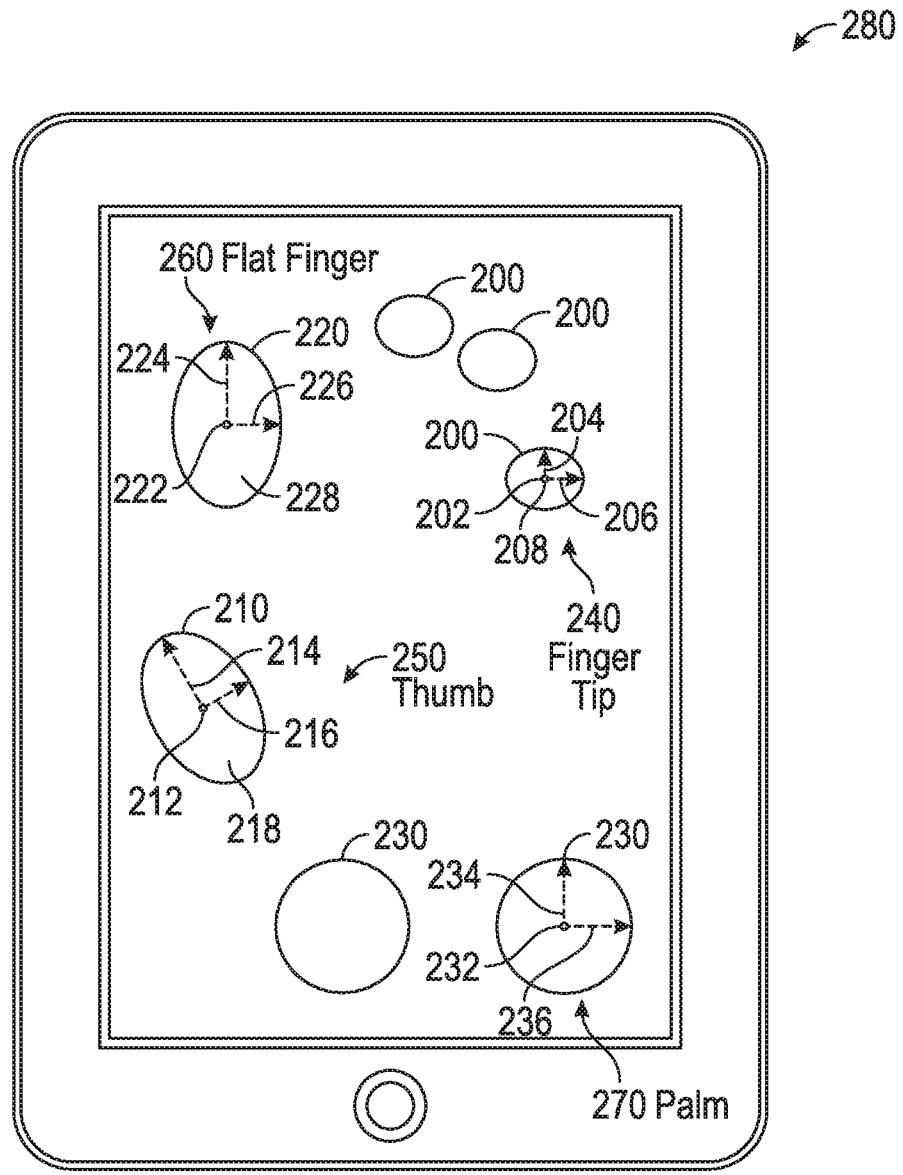
FIG. 2 illustrates an exemplary touch image capturing finger and palm touches from a user's hand touching or hovering over a touch sensor panel according to examples of the disclosure.

FIG. 2 illustrates an exemplary touch image capturing finger and palm touches from a user's hand touching or hovering over (proximate) a touch sensor panel according to examples of the disclosure. As illustrated in FIG. 2, each touch of the user's palm and fingers on the touch sensor panel 124 can be represented by an ellipse in a touch image 280. For example, a thumb 250 captured in a touch image can be defined as having centroid 212 at the center of mass of the thumb touch 210 with major and minor radii 214 and 216 defining the approximate boundaries of touch area 218. The thumb touch 210 can have an elliptical shape, where the major and minor radii 214 and 216 can be oriented substantially diagonally (e.g., not parallel to either the y-direction or the x-direction) and the major radius 214 can be longer than the minor radius 216, indicative of a detected touch of a thumb 250. The touch area 218 of the thumb touch 210 can also be larger than a fingertip touch area 208 of a fingertip 240.

A fingertip 240 captured in touch image 280 can be defined as having centroid 202 at the center of mass of the fingertip touch 200 with major and minor radii 204 and 206 defining the approximate boundaries of touch area 208. The fingertip 240 can have an elliptical, almost circular shape, where the major and minor radii 204 and 206 can be approximately the same, indicative of a detected touch of a fingertip 240.

A flat finger 260 (e.g., a finger in which the palm side of the finger is fully making contact with the touch sensor panel) captured in a touch image 280 can be defined as having centroid 222 at the center of mass of the flat finger touch 220, with major and minor radii 224 and 226 defining the approximate boundaries of touch area 228. The flat finger touch 220 can have an elliptical shape, where the major radius 224 can be longer than the minor radius 226, indicative of a detected touch of a flat finger 260. The touch area 228 of the flat finger touch 220 can be larger and more elongated than the touch area 208 of the fingertip touch 240.

A palm 270 captured in a touch image 280 can be defined as having centroid 232 at the center of mass of the palm touch 230 with major and minor radii 234 and 236 defining the approximate boundaries of touch area 238. The palm touch 230 can have an elliptical, almost circular shape, where the major and minor radii 234 and 236 can be approximately the same length and longer than the major and minor radii 204 and 206 of fingertip touch 200, indicative of a detected touch of a palm 270. The centroid 232 of the palm touch 230 can be lower in the y-direction than the centroids of the other touches. The major and minor radii 234 and 236 can be longer than the radii of the other touches. The palm touch area 238 of the palm touch 230 can also be larger than the touch areas of the other touches (e.g., fingertip touch area 208 or flat finger touch area 228).

In order to parameterize the touches of FIG. 2 with centroids and ellipses, for example, the original touch image can undergo a segmentation process to construct groups of touch nodes forming each touch. The segmentation process can include applying a filter to spatially smooth the touch image and identifying local maxima in the smoothed touch image. A group of touch nodes forming each touch can be constructed from the group of touch nodes around each local maximum encountered before reaching a boundary. The group of touch nodes forming each touch can be used to compute the centroid and ellipse parameters illustrated in FIG. 2. For a group of touch nodes forming a touch, a centroid can be calculated based on the coordinate of each touch node and weighted by the magnitude of the touch signal at the corresponding touch node. For example, the centroid of a touch can be computed using the equations (1)-(3):

$$G_z = \sum_{e \in G_E} e_z \tag{1}$$

$$G_x = \sum_{e \in G_E} \frac{e_z e_x}{G_z} \tag{2}$$

$$G_y = \sum_{e \in G_E} \frac{e_z e_y}{G_z} \tag{3}$$

where $G_E$ can represent the group of touch nodes in a touch, $e_z$ can be the touch signal corresponding to a touch node, $G_z$ can be the total touch signal for all touch nodes in the group of touch nodes forming the touch, and $e_x$ and $e_y$ can be the coordinates of the touch nodes in centimeters on the surface of the touch sensor panel. Thus, $G_x$ and $G_y$ can define the x and y coordinates of the centroid for the touch.

An ellipse can be fit around the centroid of a touch by computing the covariance matrix of the group of touch nodes forming the touch. The eigenvalues of the covariance matrix can determine the ellipse major axis and minor axis lengths and the eigenvectors can be used to determine the orientation of the ellipse. The ellipse fitting procedure can involve a unitary transformation of the covariance matrix $G_{cov}$ of second moments $G_{xx}$, $G_{xy}$, $G_{yx}$, $G_{yy}$ defined by equations (4)-(7):

$$G_{cov} = \begin{bmatrix} G_{xx} & G_{xy} \\ G_{yx} & G_{yy} \end{bmatrix} \tag{4}$$

$$G_{xx} = \sum_{e \in G_E} e_z (G_x - e_x)^2 \tag{5}$$

$$G_{yx} = G_{xy} = \sum_{e \in G_E} e_z (G_x - e_x)(G_y - e_y) \tag{6}$$

$$G_{yy} = \sum_{e \in G_E} e_x (G_y - e_y)^2 \tag{7}$$

As discussed above, the eigenvalues $\lambda_0$ and $\lambda_1$ of the covariance matrix $G_{cov}$ can determine the ellipse axis lengths (i.e. major axis $G_{major}$ and minor axis $G_{minor}$) and orientation $G_\theta$, as defined in equations (8)-(10):

$$G_{major} = \sqrt{\lambda_0} \tag{8}$$

$$G_{minor} = \sqrt{\lambda_1} \tag{9}$$

$$G_\theta = \arctan\left(\frac{\lambda_0 - G_{xx}}{G_{xy}}\right) \tag{10}$$

where $G_\theta$ can be uniquely wrapped into the range (0, 180°).

Figure 3:
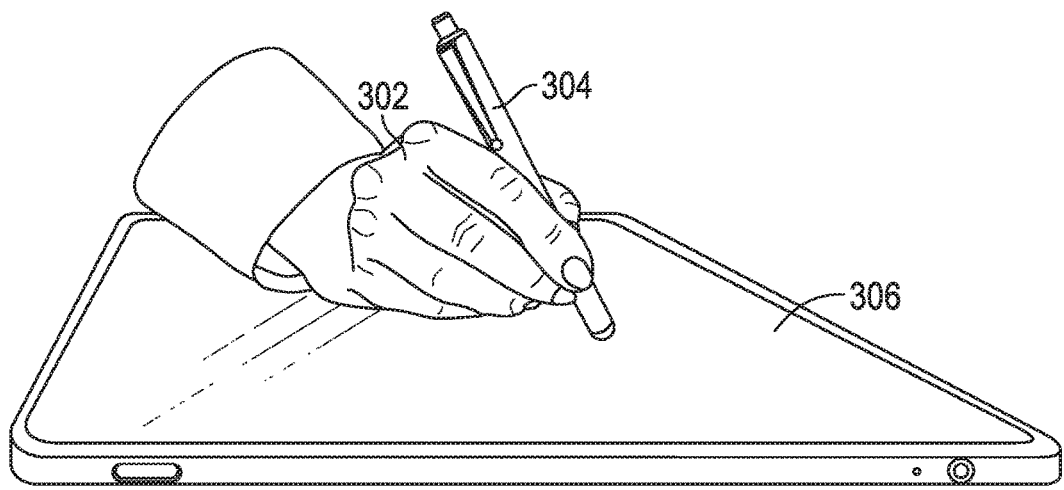
FIG. 3 illustrates an exemplary touch on a touch sensor panel by a user's hand and stylus according to examples of the disclosure.

When a stylus in the hand of a user touches or hovers over (i.e., is proximate to) a touch sensor panel, the touch image can capture other types of touches. FIG. 3 illustrates an exemplary touch on a touch sensor panel by a user's hand and stylus according to examples of the disclosure. As illustrated, a hand 302 grasping a stylus 304 can touch or hover over the touch sensor panel 306. Specifically, the side of the hand 302 as well as the tip of the stylus 304 can touch or hover over the touch sensor panel 306. In some examples, the hand 302 can be grasping the stylus 304 such that the side of the hand and some knuckles can touch or hover over the touch sensor panel 306 in addition to the stylus tip.

Figure 4B:
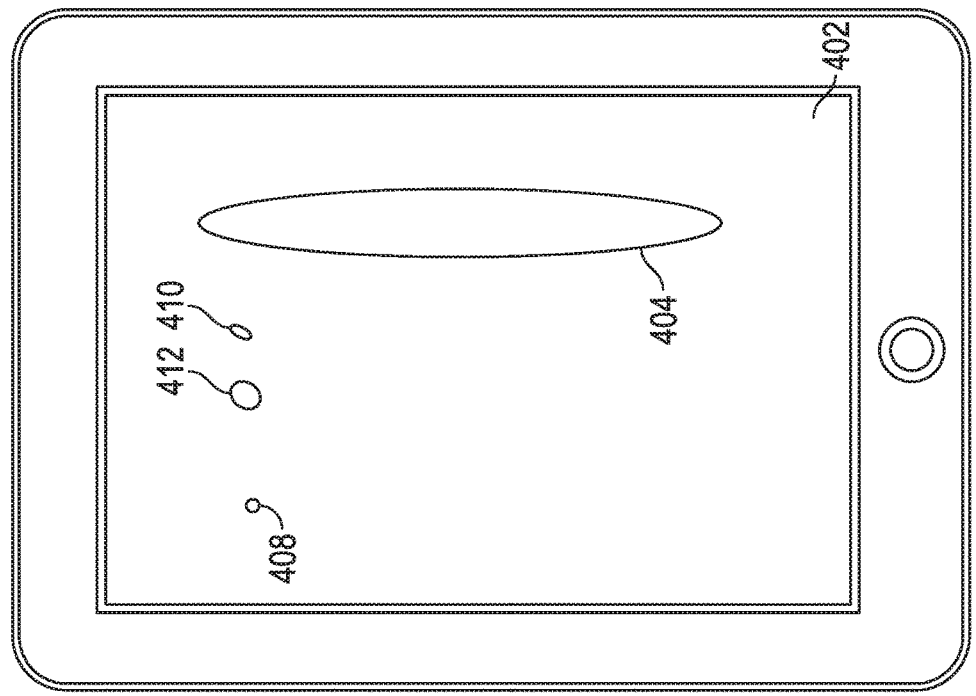
FIGS. 4A and 4B illustrate exemplary touch images capturing portions of a user's hand and a stylus touching or hovering over a touch sensor panel according to examples of the disclosure.
Figure 4A:
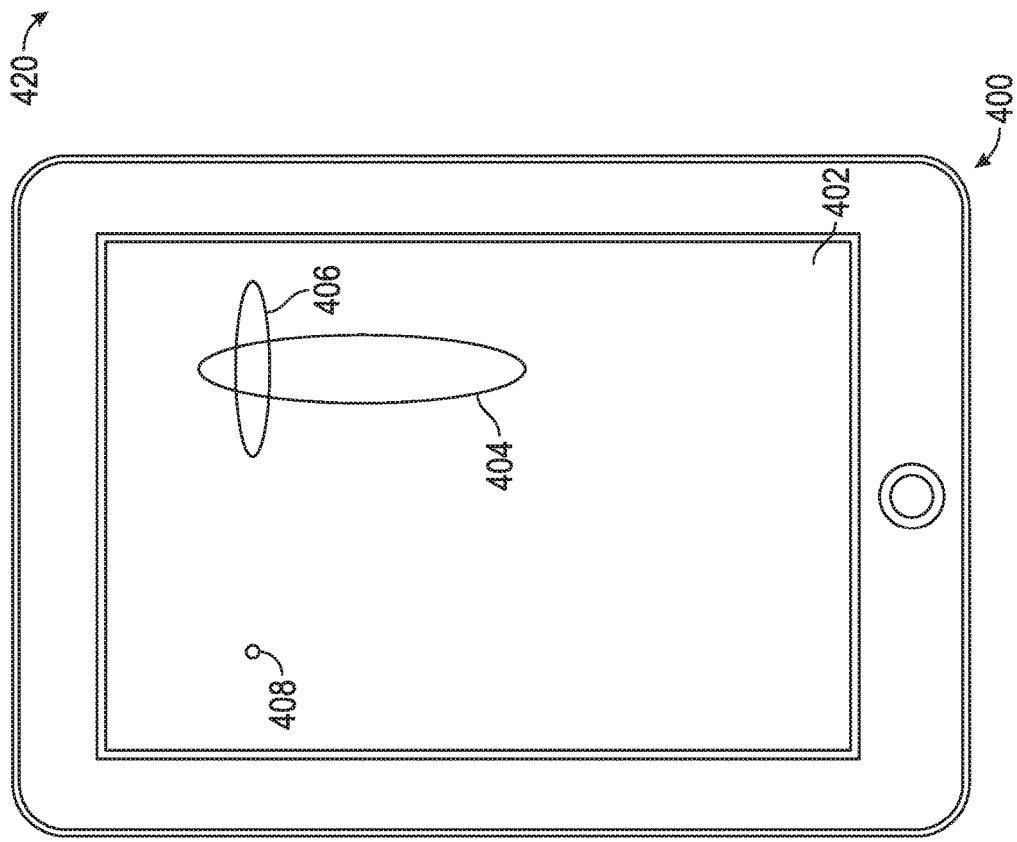

FIGS. 4A and 4B illustrate exemplary touch images 400 and 420 capturing portions of a user's hand and a stylus touching or hovering over a touch sensor panel according to examples of the disclosure. FIG. 4A illustrates a touch image 400 that can correspond to a user's hand and a stylus tip touching or hovering over a touch panel such that only the side of the user's hand and the stylus tip can detected by the touch sensor panel 402. For example, the side of the user's hand can be approximated as two separate ellipses 404 and 406. Ellipse 404 can correspond to the side of the hand beginning from the wrist to the lowermost knuckle (i.e., the knuckle closest to the wrist) of the pinky finger. Ellipse 406 can correspond to the side of the hand that begins at the lowermost knuckle of the pinky finger to the middle knuckle of the pinky finger. In this way, the whole side of the hand that touches or hovers over the touch sensor panel with a stylus can be accounted for in touch image 400. The tip of the stylus can be approximated by the touch sensor panel as circle 408.

FIG. 4B illustrates a touch image 420 that can correspond to a user's hand and a stylus tip touching or hovering over a touch panel such that in the side of the user's hand and some knuckles of the user's hand can be detected by the touch sensor panel 402. For example, the side of the user's hand can be approximated by an ellipse 404. Ellipse 404 can correspond to the side of the hand beginning from the wrist to the lowermost knuckle of the pinky finger. In addition to the side of the hand, one or more of the user's knuckles can be touching or hovering over the touch sensor panel 402. Each knuckle can be approximated by an ellipse such as those depicted at 410 and 412. The tip of the stylus can be approximated by the touch sensor panel as circle 408.

The various finger and palm touches captured in touch image 280 and the various palm, knuckle and stylus touches in touch images 400 and 420 can be processed to reject undesired touch events. For example, the touches in touch image 280 can correspond to a user typing on a touch sensitive device. The flat finger contact 260 can correspond to a user actuating a key, and fingertip touches 240 can correspond to fingers resting in place. In the above example, it can be useful to reject palm contacts as the palm contacts can be unnecessary for further processing. Additionally, it can be useful to reject palm contacts because processing palm contacts can result in unintended behavior. As another example, the stylus touches 408 of touch images 400 and 420 can be of interest and desirable for additional processing, but the undesired palm and knuckle touches 404, 406, 410, 412 can be rejected as unnecessary or to avoid unintended behavior.

Rejecting unwanted or undesired touches can be difficult if the orientation of the user's hand with respect to the touch sensitive device is unknown. In some applications the orientation of the user's hand can be known in advance. For example, the orientation of a user's hand can be known for a touch keyboard device. Other touch sensitive devices, however, can be rotated and the user's hand can be oriented at any angle with respect to the touch sensitive surface. In such devices, rejecting undesired touches can require trying a large number of possible orientations in order to properly reject undesired touches.

Figure 5:
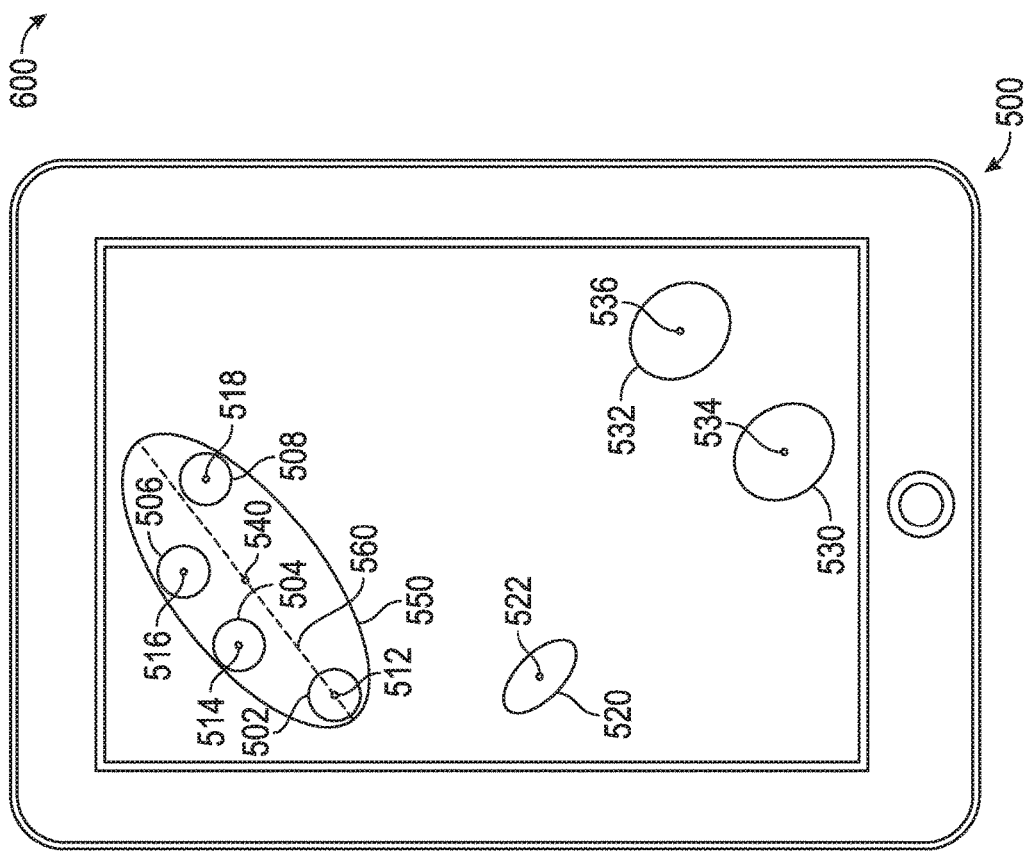
FIG. 5 illustrates an exemplary method of determining the orientation of a user's hand according to examples of the disclosure.

Weighted meta-centroid computation and meta-ellipse fitting techniques can be used to determine the orientation of a user's hand. As used herein, meta-centroid and meta-ellipse fitting can refer to centroid computation and ellipse fitting techniques applied after the centroid and ellipse fitting techniques illustrated in FIG. 2, for example, are used to identify touches in the touch image. FIG. 5 illustrates an exemplary method of determining the orientation of a user's hand according to examples of the disclosure. In the example of FIG. 5, a touch image 500 can capture finger and palm touches from a user's hand touching or hovering over a touch sensor panel. Touch image 500 can include thumb touch 520 with centroid 522, fingertip touches 502, 504, 506 and 508 with centroids 512, 514, 516, and 518, and palm touches 530 and 532 with centroids 534 and 536.

A meta-centroid 540 can be computed for all of the various touches by strategically weighting the various touches. The weighted meta-centroid computation can be tuned such that the weighted meta-centroid considers almost exclusively fingertip touches 502, 504, 506 and 508. For example, touches can be weighted inversely to their size and distance from the nearest neighboring touch. Thus, relatively small fingertip touches 502, 504, 506 and 508 can be weighted higher than relatively large thumb touch 520 and palm touches 532 and 534. Similarly, relatively proximate fingertip touches 502, 504, 506 and 508 can be weighted higher than relatively distant thumb touch 520 and palm touches 530 and 532.

In computing the meta-centroid, $G_{E,meta}$ can be the set of touches in touch image 500, $e_{z,meta}$ can be the weighting of touch e, and $e_{x,meta}$ and $e_{y,meta}$ can be the coordinates of the centroid of touches in centimeters on the surface of the touch sensor panel. The weighted meta-centroid can be computed from positions and weightings of the touches as defined in equations (11)-(13):

$$G_{z,meta} = \sum_{e \in G_{E,meta}} e_{z,meta} \quad (11)$$

$$G_{x,meta} = \sum_{e \in G_{e,meta}} \frac{e_{z,meta} e_{x,meta}}{G_{z,meta}} \quad (12)$$

$$G_{y,meta} = \sum_{e \in G_{E,meta}} \frac{e_{z,meta} e_{y,meta}}{G_{z,meta}} \quad (13)$$

where $G_{z,meta}$ can represent the total weighting of all touches in the set of touches, and $G_{x,meta}$ and $G_{y,meta}$ can represent the coordinates of the meta-centroid.

A meta-ellipse 550 can be fit around meta-centroid 540 to the area containing fingertip touches 502, 504, 506, 508 by computing the covariance matrix of the touches, weighted as above. The eigenvalues of the covariance matrix can determine the meta-ellipse major axis 560 and minor axis lengths and the eigenvectors can be used to determine the orientation of the meta-ellipse. The major axis orientation can be representative of the orientation of a user's hand.

The meta-ellipse fitting procedure can involve a unitary transformation of the covariance matrix $G_{cov,meta}$ of second moments $G_{xx,meta}$, $G_{xy,meta}$, $G_{yx,meta}$, $G_{yy,meta}$ defined by equations (14)-(17):

$$G_{cov,meta} = \begin{bmatrix} G_{xx,meta} & G_{xy,meta} \\ G_{yx,meta} & G_{yy,meta} \end{bmatrix} \quad (14)$$

$$G_{xx,meta} = \sum_{e \in G_{E,meta}} e_{z,meta}(G_{x,meta} - e_{x,meta})^2 \quad (15)$$

$$G_{yx,meta} = \quad (16)$$
$$G_{xy,meta} = \sum_{e \in G_{E,meta}} e_{z,meta}(G_{x,meta} - e_{x,meta})(G_{y,meta} - e_{y,meta})$$

$$G_{yy,meta} = \sum_{e \in G_{E,meta}} e_{x,meta}(G_{y,meta} - e_{y,meta})^2 \quad (17)$$

As discussed above, the eigenvalues $\lambda_{0,meta}$ and $\lambda_{1,meta}$ of the covariance matrix $G_{cov,meta}$ can determine the meta-ellipse axis lengths (i.e. major axis $G_{major,meta}$ and minor axis $G_{minor,meta}$) and orientation $G_{\theta,meta}$ as defined by equations (18)-(20):

$$G_{major,meta} = \sqrt{\lambda_{0,meta}} \quad (18)$$

$$G_{minor,meta} = \sqrt{\lambda_{1,meta}} \quad (19)$$

$$G_{\theta,meta} = \arctan\left(\frac{\lambda_{0,meta} - G_{xx,meta}}{G_{xy,meta}}\right) \quad (20)$$

where $G_{\theta,meta}$ can be uniquely wrapped into the range (0, 180°).

In other examples, thumb touch 520 can be weighted with an intermediate weight rather than being weighted like palm touches 530 and 532. For example, the weighting can look not only at the nearest neighbor distance, but also at the distance between the nearest neighbor and the next nearest neighbor. Thus, although the distance between thumb touch 520 and its nearest neighbor fingertip touch 502 can be large compared to the distance between fingertip touches, because the distance between nearest neighbor fingertip touch 502 and next nearest neighbor fingertip touch 504 is small, the thumb touch 520 can be weighted with an intermediate weighting rather than a small weighting.

The major axis orientation can indicate two possible orientations. For example, meta-ellipse 550 can correspond to a hand touching or hovering over the touch sensor panel as shown in the touch image of FIG. 5 or to a hand rotated 180°. In some examples, the palm rejection algorithm can try both orientations to determine a proper orientation for touch rejection. In other examples, the thumb touch 520 or the curvature of the fingertip touches 502, 504, 506 and 508 can be used to determine the proper orientation.

Figure 6:
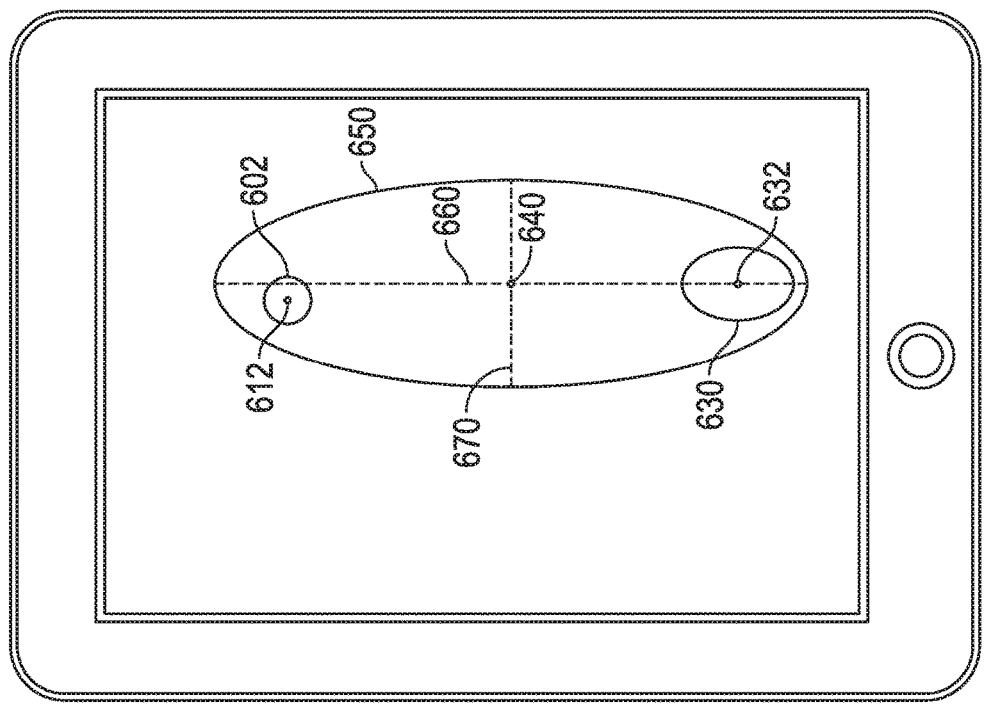
FIG. 6 illustrates an exemplary special handling of a determination of the orientation of a user's hand according to examples of the disclosure.

In some examples, special handling can be used for special cases. FIG. 6 illustrates an exemplary special handling of a determination of the orientation of a user's hand according to examples of the disclosure. In the example of FIG. 6, a touch image 600 can capture finger and palm touches from a user's hand touching or hovering over a touch sensor panel. Touch image 600 can include palm touch 630 with a centroid 632 and fingertip touch 602 with centroid 612. The meta-centroid computation and meta-ellipse fitting procedure can produce a meta-ellipse 650 with meta-centroid 640, major axis 660 and minor axis 670. Because there are only two touches, the orientation of the major axis can be approximately the same orientation as a line drawn between the fingertip touch 602 and palm touch 630. In this case the major axis orientation can be 90° different than the actual orientation of the hand. For example, major axis 560 in FIG. 5 can be parallel to a line dividing the fingers from the palm of the hand, whereas major axis 660 in FIG. 6 can be perpendicular to the line dividing the fingers from the palm of the hand. In such a case, the minor axis orientation rather than the major axis orientation can be used to determine the orientation of the hand. Alternatively, the orientation can be determined by adjusting the major axis orientation by 90°.

Figure 7:
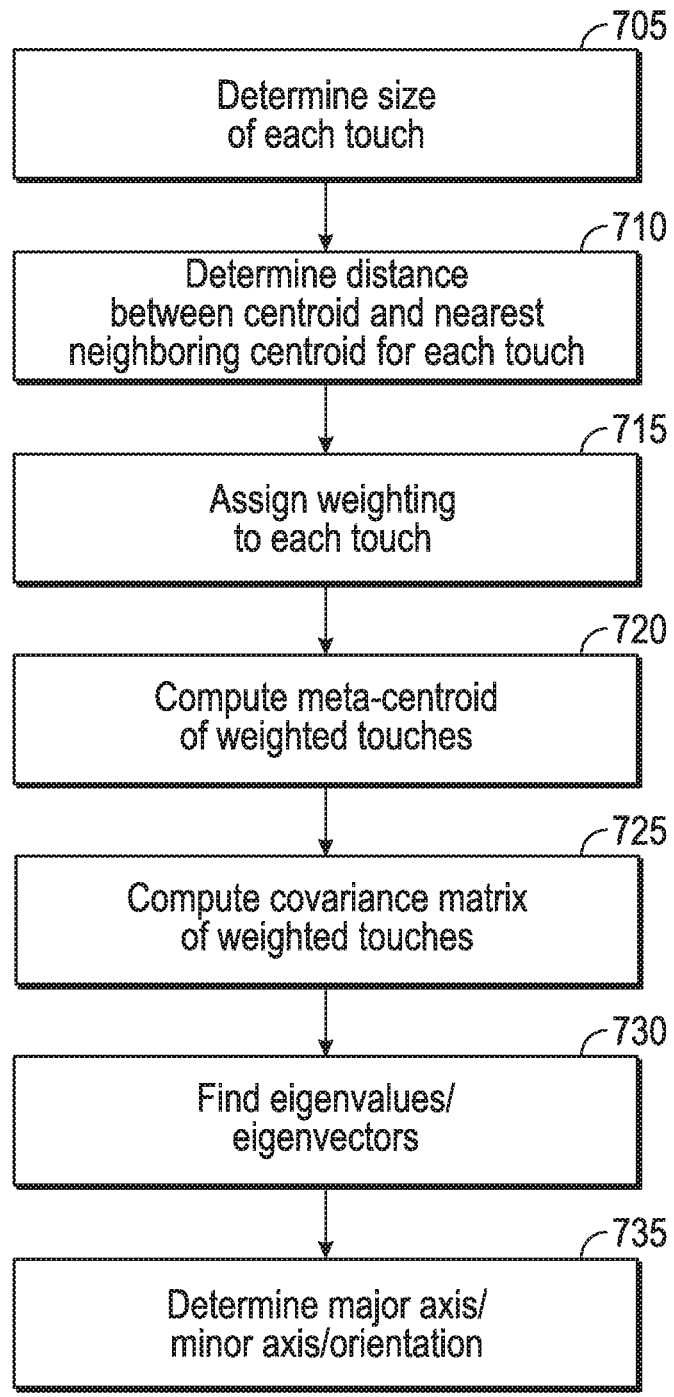
FIG. 7 illustrates an exemplary algorithm for determining the orientation of a user's hand according to examples of the disclosure.

FIG. 7 illustrates an exemplary algorithm for determining the orientation of a user's hand according to examples of the disclosure. For each touch in the touch image, a size can be determined (705) and a distance between the centroid of a touch and the centroid of the nearest neighboring touch can be determined (710). In some examples, the size of a touch can be based on its area. In other examples, the size of a touch can be based on its major and/or minor axis. Weights can be determined and assigned to each touch based on its size and distance to the nearest neighboring touch (715). A weighted meta-centroid of all touches in the touch image can be computed (720). A covariance matrix can be computed based on the weighted touches (725). Eigenvalues and eigenvectors of the covariance matrix can be determined (730). The eigenvalues and eigenvectors can be used to determine the major axis and minor axis lengths and the orientation of the meta-ellipse and the user's hand (735).

The orientation of the hand can be used to reject palm contacts or other undesired contacts using existing methods. Additionally, identifying the orientation of a user's hand can be advantageous to improve touch classification including at least finger identification, thumb identification, finger sorting order (e.g. identifying touches as corresponding to specific fingers based on their ordering), left versus right hand identification (e.g. identifying and associating each touch with either a left or right hand), and gesture recognition.

Figure 8:
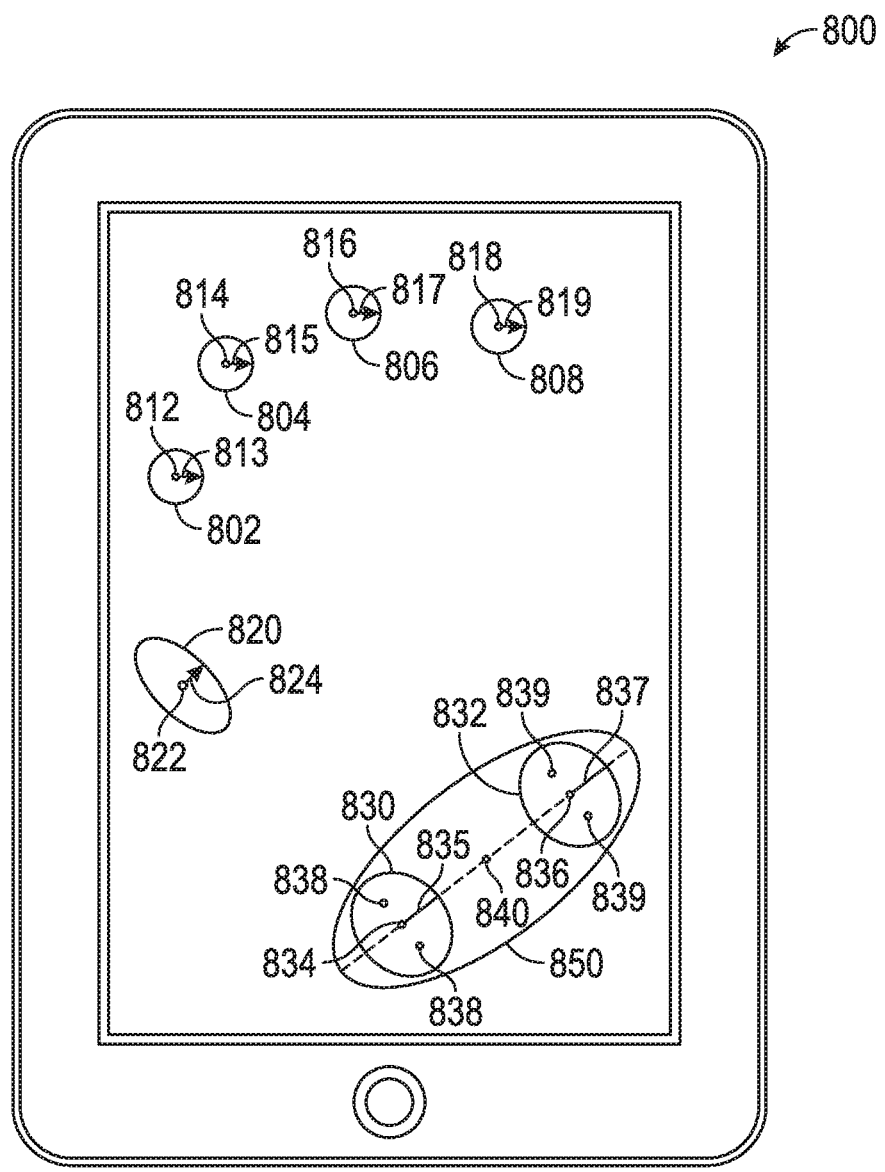
FIG. 8 illustrates an exemplary method of rejecting palm contacts and other undesired contacts according to examples of the disclosure.

In other examples, palm contacts and other undesired contacts can be rejected irrespective of the orientation of the user's hand, i.e. without determining the orientation of the user's hand. Weighted meta-centroid computation and meta-ellipse fitting techniques can be used to determine the portions of the touch image to reject. FIG. 8 illustrates an exemplary method of rejecting palm contacts and other undesired contacts according to examples of the disclosure. In the example of FIG. 8, a touch image 800 can capture finger and palm touches from a user's hand touching or hovering over a touch sensor panel. Touch image 800 can include thumb touch 820 with a centroid 822 and minor radius 824, fingertip touches 802, 804, 806 and 808 with centroids 812, 814, 816, and 818 and minor radii 813, 815, 817 and 819, and palm touches 830 and 832 with centroids 834 and 836 and minor radii 835 and 837.

A meta-centroid 840 can be computed of all the various touches by strategically weighting the various touches. The weighted meta-centroid computation can be tuned such that the weighted meta-centroid considers almost exclusively palm touches 830 and 832. For example, touches can be weighted based on size. Thus, relatively small fingertip touches 802, 804, 806 and 808 can be weighted lower than relatively large palm touches 830 and 832. A meta-ellipse 850 can be fit around meta-centroid 840 to the area containing palm touches 830 and 832 by computing the covariance matrix of the touches, weighted as above. The eigenvalues of the covariance matrix can determine the meta-ellipse major and minor axis lengths and the eigenvectors can be used to determine the orientation of the meta-ellipse. The portions of the touch image 800 encompassed by meta-ellipse 850 can be rejected.

Figure 9A:
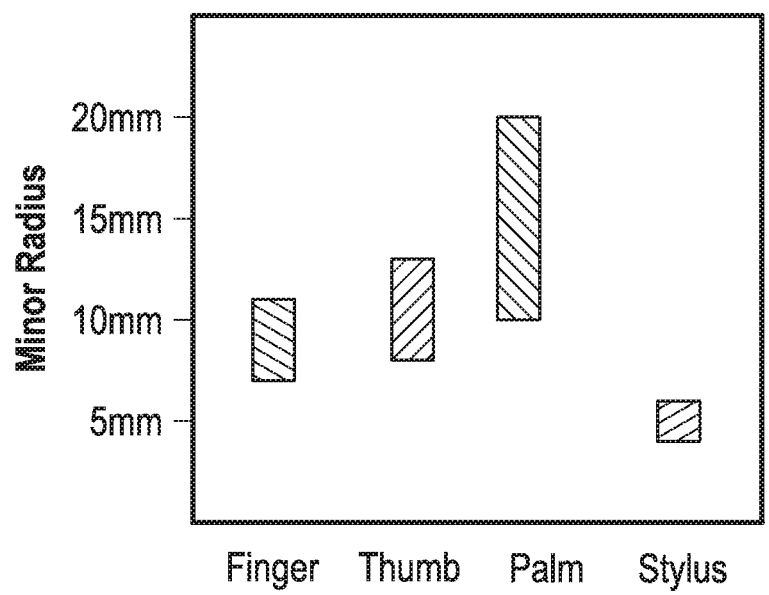
FIGS. 9A through 9D illustrate exemplary minor radii for various touches and exemplary thresholds for modifying the minor radii for various touches according to examples of the disclosure.
Figure 9B:
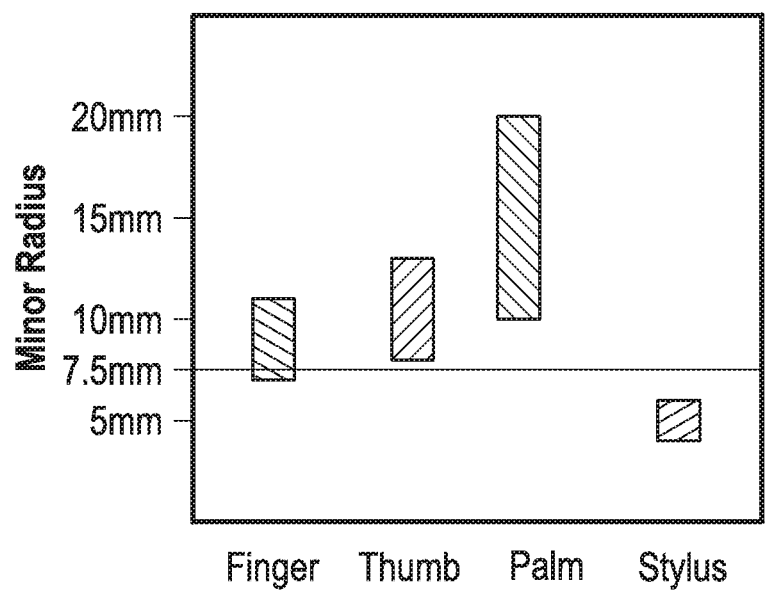
Figure 9C:
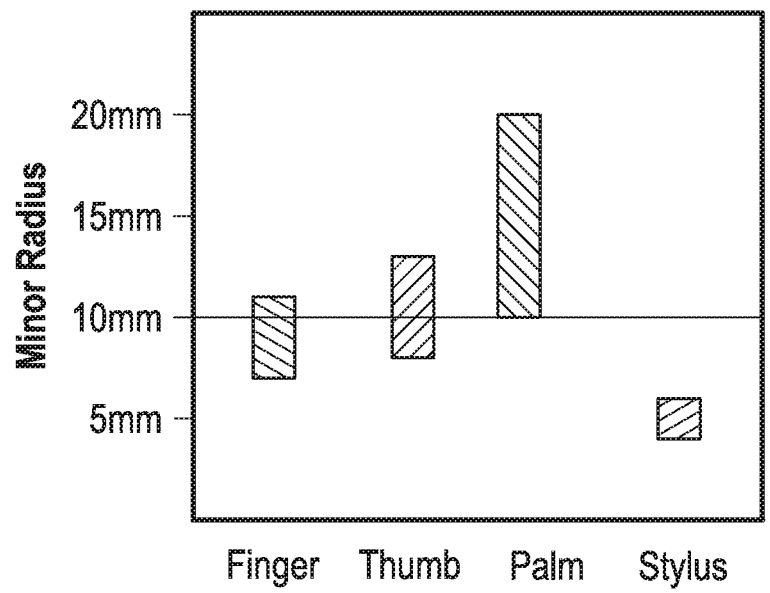
Figure 9D:
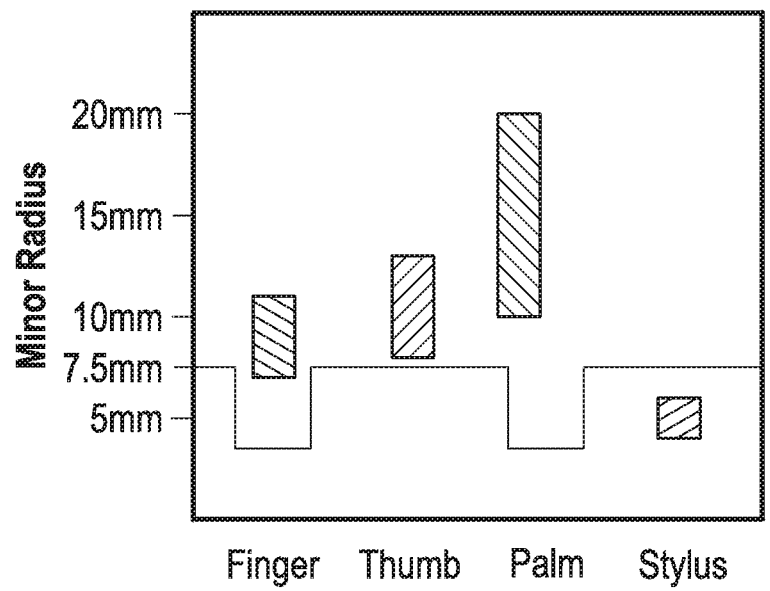

In some examples the touches can be weighted based on their minor radii. FIG. 9A illustrates an exemplary range of minor radii for various touches. For example, finger touches 902 can have minor radii between 7 mm and 11 mm, thumb touches 904 can have minor radii between 8 mm and 13 mm, palm touches 906 can have minor radii between 10 mm and 20 mm and stylus touches 908 can have minor radii between 4 mm and 6 mm. As illustrated in FIG. 9B, in some examples, all touches with a minor radius below a threshold value, e.g. 7.5 mm, can be ignored, i.e. given zero weight, and the remaining touches can be weighted based the minor radius of the touch in excess of the threshold value. In other examples, illustrated in FIG. 9C, the threshold can be higher, e.g. 10 mm, when a stylus is not being used and the remaining touches can be weighted based the minor radius of the touch in excess of the threshold value. In other examples, illustrated in FIG. 9D, the threshold can vary based on the initial size of the minor radius of a touch. For example, finger touches within a distance of other large touches, e.g. within 3-4 cm, and palm touches 902 and 906 can have a reduced threshold value, e.g. 3 mm, and the remaining touches can be weighted based the minor radius of the touch in excess of the threshold value.

Although in some examples discussed above the meta-centroid calculation and meta-ellipse fitting can be done using only the centroid of each identified touch in the touch image, a different number of points can be used to represent the identified touches for meta-centroid calculation and meta-ellipse fitting. For example, the weighted meta-centroid can be computing using foci 838 and 839 rather than centroids 834 and 836 of palm touches 830 and 832. In other examples, the weighted meta-centroid can be computed using the foci of each touch identified in the touch image (i.e. not only for palm touches). In other examples, the weighted meta-centroid can be computed using each touch node in the touch image, i.e. the original touch signal magnitude and location data, by weighting the magnitude of the touch signal each touch node based on the weighting schemes discusses above (e.g. minor radii of a touch encompassing the touch node, distance of centroid of a touch encompassing the touch node to the centroid of the nearest neighboring touch, etc.). Increasing the number of points to consider for the weighted meta-centroid and meta-ellipse fitting can increase the required computation, but can also improve the fidelity between the meta-ellipse shape and the underlying touch image.

Figure 10B:
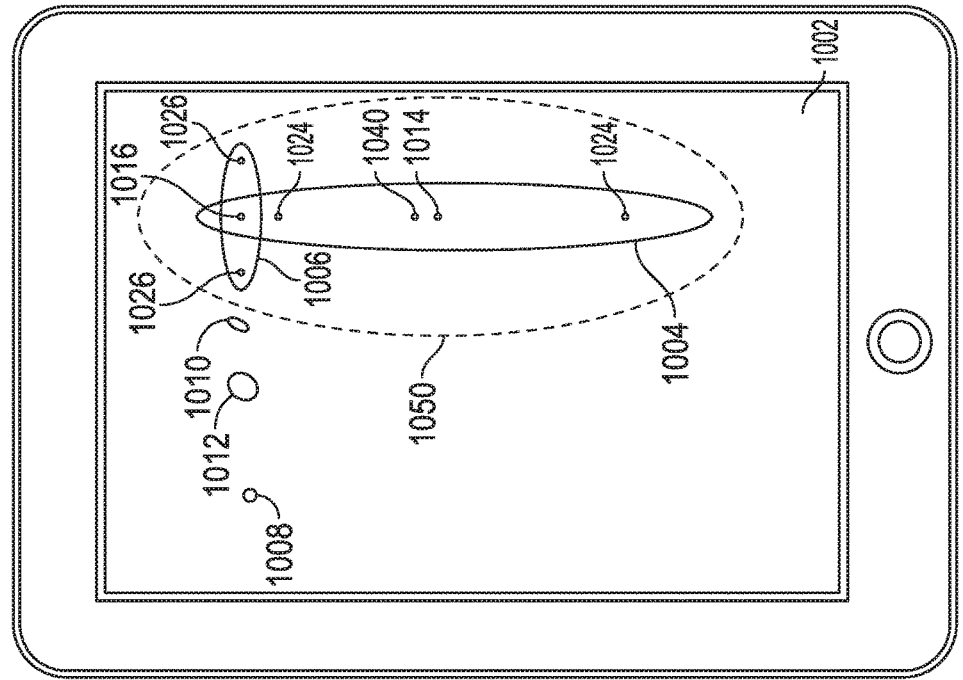
FIGS. 10A and 10B illustrate other exemplary methods of rejecting palm contacts and other undesired contacts according to examples of the disclosure.
Figure 10A:
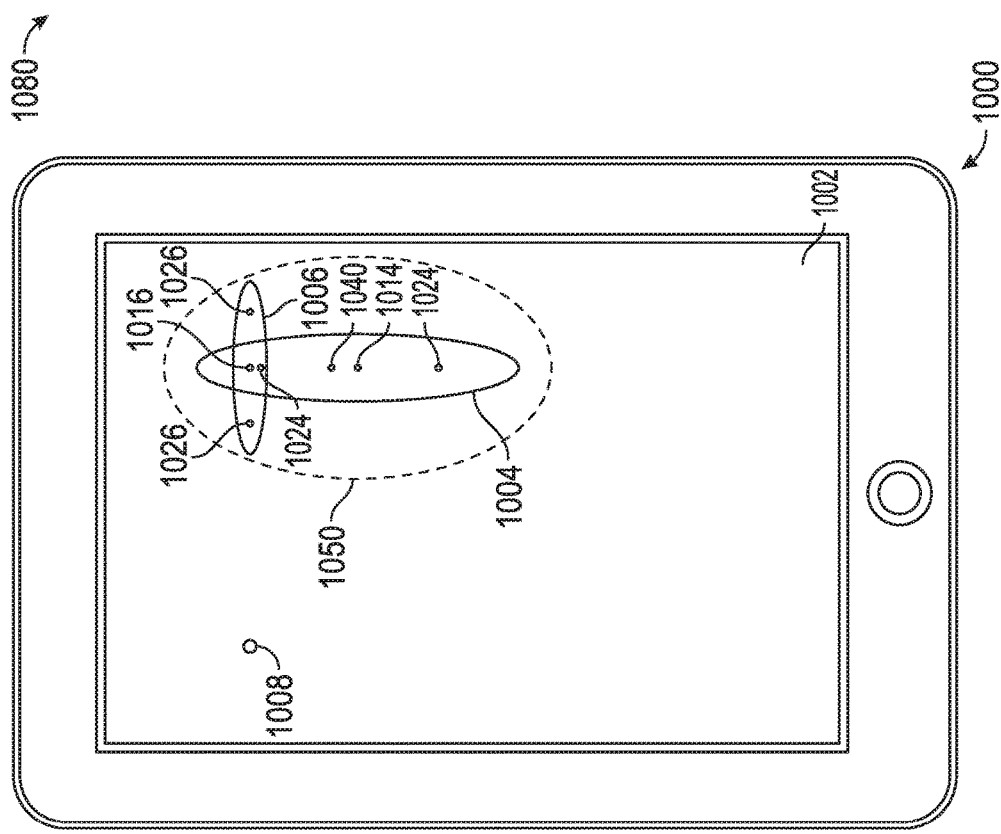

FIGS. 10A and 10B illustrate other exemplary methods of rejecting palm contacts and other undesired contacts according to examples of the disclosure. In the example of FIG. 10A, a touch image 1000 can capture touches from a user's hand touching or hovering over a touch sensor panel. Touch image 1000 can include two separate ellipses 1004 and 1006 corresponding to the side of the user's hand and a stylus touch 1008. Ellipses 1004 and 1006 can have centroids 1014 and 1016. A meta-centroid 1040 can be computed of all the various touches by strategically weighting the various touches. The weighted meta-centroid computation can be tuned such that the weighted meta-centroid considers almost exclusively ellipses 1004 and 1006. For example, touches 1004, 1006 and 1008 can be weighted based on the length of the minor radii as discuss above with respect to FIGS. 8 and 9. Thus, relatively small stylus touch 1008 can be weighted lower than relatively large ellipses 1004 and 1006. A meta-ellipse 1050 can be fit around meta-centroid 1040 to the area containing ellipses 1004 and 1006 by computing the covariance matrix of touches 1004, 1006 and 1008, weighted as above. The eigenvalues of the covariance matrix can determine the meta-ellipse major and minor axis lengths and the eigenvectors can be used to determine the orientation of the meta-ellipse. The portions of the touch image 1000 encompassed by meta-ellipse 1050 can be rejected.

In some examples, the weighted meta-centroid can be computing using the foci 1024 and 1026 rather than centroids 1014 and 1016 of ellipses 1004 and 1006. Using the foci rather than the centroid can result in a more accurate meta-centroid and meta-ellipse fitting for the ellipses representing the side of the hand. As discussed above, with respect to FIG. 8, in other examples, the meta-centroid and meta-ellipse fitting can be implemented using contributions from each touch node in the touch image, i.e. the original touch signal magnitude and location data, by weighting the magnitude of each touch node based on the weighting schemes discusses above (e.g. minor radii of a touch encompassing the touch node, distance of centroid of a touch encompassing the touch node to the centroid of the nearest neighboring touch, etc.). Increasing the number of points to consider for the weighted meta-centroid and meta-ellipse fitting can increase the required computation, but can also improve the fidelity between the meta-ellipse shape and the underlying touch image.

In the example of FIG. 10B, a touch image 1080 can capture touches from a user's hand touching or hovering over a touch sensor panel. Touch image 1080 can include two separate ellipses 1004 and 1006 corresponding to the side of the user's hand, a stylus touch 1008 and two knuckle touches 1010 and 1012. Ellipses 1004 and 1006 can have centroids 1014 and 1016. A meta-centroid 1040 can be computed of all the various touches by strategically weighting the various touches. The weighted meta-centroid computation can be tuned such that the weighted meta-centroid considers almost exclusively ellipses 1004 and 1006. For example, touches 1004, 1006 1008, 1010 and 1012 can be weighted based on length of the minor radii as discuss above with respect to FIGS. 8 and 9. Thus, relatively small stylus touch 1008 and knuckle touches 1010 and 1012 can be weighted lower than relatively large ellipses 1004 and 1006. A meta-ellipse 1050 can be fit around meta-centroid 1040 to the area containing ellipses 1004 and 1006 by computing the covariance matrix of touches 1004, 1006 and 1008, weighted as above. The eigenvalues of the covariance matrix can determine the meta-ellipse major and minor axis lengths and the eigenvectors can be used to determine the orientation of the meta-ellipse. The portions of the touch image 1080 encompassed by meta-ellipse 1050 can be rejected.

Additionally, satellite touches within a threshold distance of meta-ellipse 1050 can be rejected. For example, if a touch is within a threshold distance, e.g. 1 cm, of meta-ellipse 1050, the touch can be rejected. In other examples, touches within a threshold distance, e.g. 4 cm, of meta-centroid 1040 of meta-ellipse 1050, the touch can be rejected. For example, knuckles 1010 and 1012 can be within the threshold distance from the meta-ellipse or the meta-centroid and therefore be ignored such that only the stylus touch 1008 can be considered for additional processing. In some examples, touches within a threshold distance, e.g. 1 cm, from the stylus can be considered even if they can be within a threshold distance of meta-ellipse 1050 or meta-centroid 1040.

Using the above described meta-centroid calculation and meta-ellipse fitting can be particularly advantageous in cases involving palm and/or knuckles touches that can be recognized so as to increase the number of touches in a touch image. For example, although each palm touch 230 in FIG. 2 can be identified as a single touch, in other examples, due to the amount of signal received by each touch node and the segmentation process, the palm can be represented by a number of smaller touches. Methods of touch identification and rejection based on sorting or template matching or pair orientation testing can become computationally unwieldy as the number of touches increases. The meta-centroid calculation and meta-ellipse fitting, however, can be used to reduce the computational complexity by rejecting palm and/or knuckle touches and thus reduce the number of touches to identify, for example.

Figure 11:
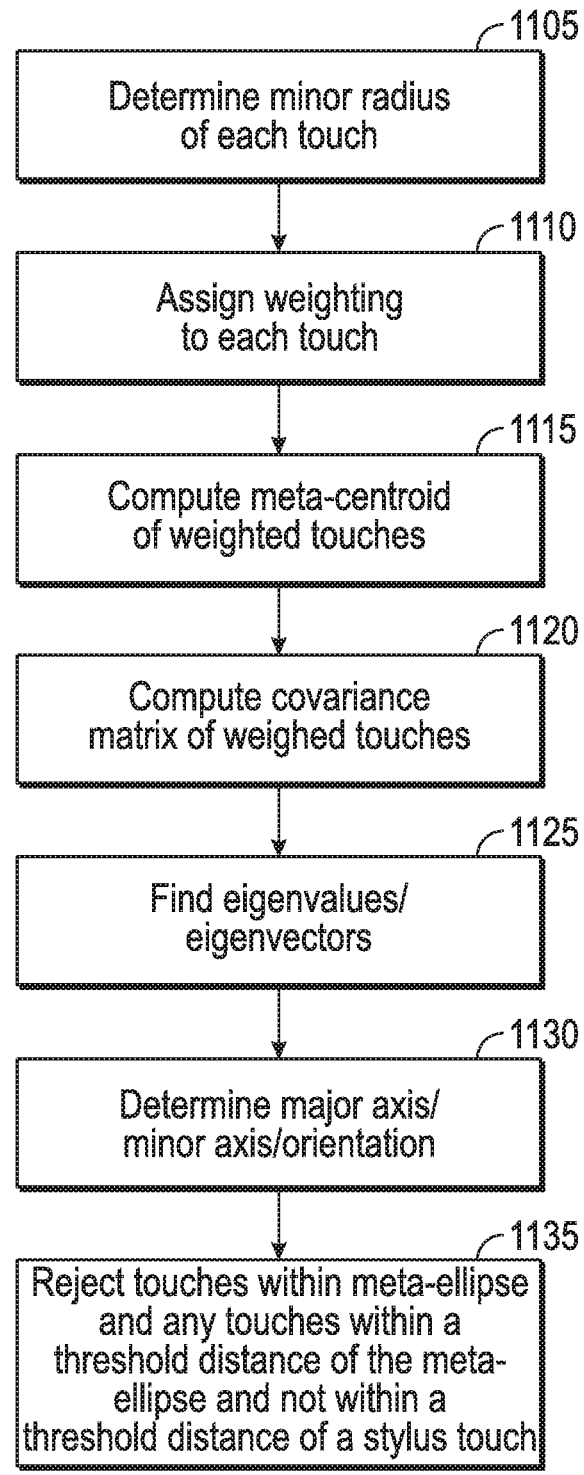
FIG. 11 illustrates an exemplary algorithm for rejecting undesired touches according to examples of the disclosure.

FIG. 11 illustrates an exemplary algorithm for rejecting undesired touches according to examples of the disclosure. For each touch in the touch image, the minor radius can be determined (1105). Weightings can be determined and assigned to each touch based its minor radius (1110). In some examples determining the weighting can include modifying the minor radii by subtracting a threshold value. A weighted meta-centroid of all touches in the touch image can be computed (1115). A covariance matrix can be computed based on the weighted touches (1120). Eigenvalues and eigenvectors of the covariance matrix can be determined (1125). The eigenvalues and eigenvectors can be used to determine the major axis and minor axis lengths and the orientation of the meta-ellipse (1130). Touches within the meta-ellipse and touches within a threshold distance of the ellipse boundary or meta-centroid, but not within a threshold distance of a stylus touch, can be rejected (1135).

Figure 12A:
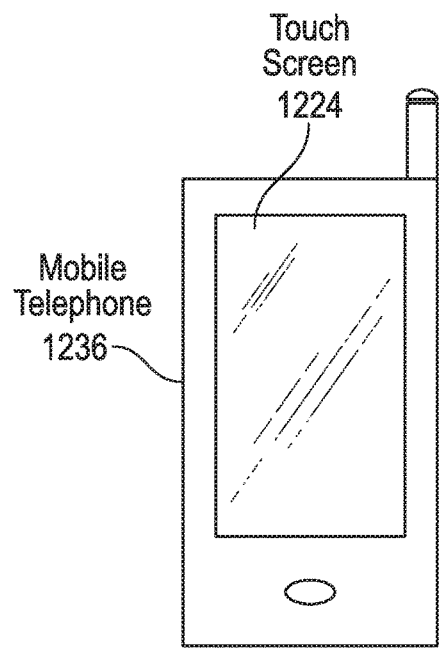
FIGS. 12A-12D illustrate example systems in which orientation determination and/or touch rejection according to examples of the disclosure can be implemented.
Figure 12B:
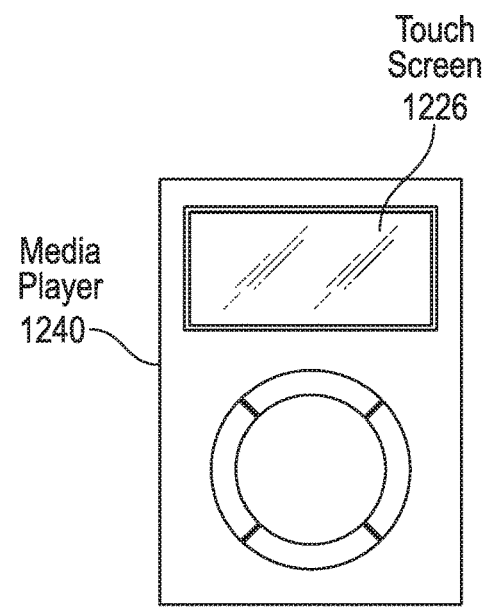
Figure 12C:
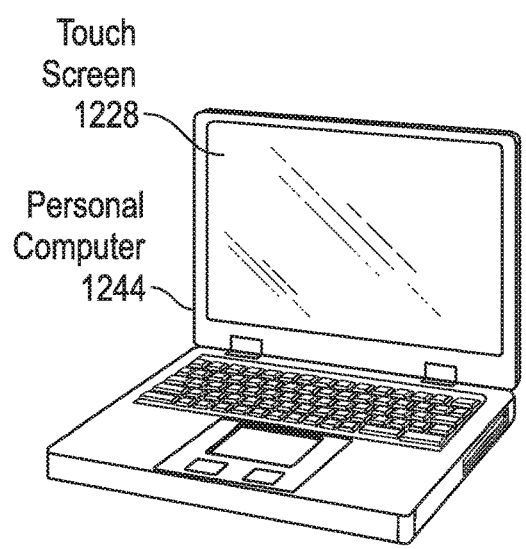
Figure 12D:
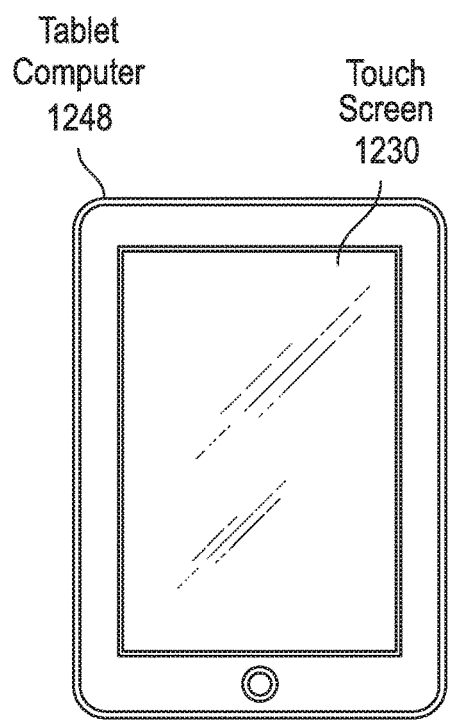

FIGS. 12A-12D illustrate example systems in which orientation determination and/or touch rejection according to examples of the disclosure can be implemented. FIG. 12A illustrates an example mobile telephone 1236 that includes a touch screen 1224 and other computing system blocks that can implement orientation determination and/or touch rejection according to various examples. FIG. 12B illustrates an example digital media player 1240 that includes a touch screen 1226 and other computing system blocks that can implement orientation determination and/or touch rejection according to various examples. FIG. 12C illustrates an example personal computer 1244 that includes a touch screen 1228 and other computing system blocks that can implement orientation determination and/or touch rejection according to various examples. FIG. 12D illustrates an example tablet computing device 1248 that includes a touch screen 1230 and other computing system blocks that can implement orientation determination and/or touch rejection according to various examples. The touch screen and computing system blocks that can implement orientation determination and/or touch rejection can be implemented in other devices including in wearable devices.

Therefore, according to the above, some examples of the disclosure are directed to a method for estimating an orientation of a stylus relative to a touch sensor panel. The method can comprise identifying a plurality of touches from a touch image of the hand proximate to the touch sensing surface, weighting the plurality of touches, determining a meta-centroid of the plurality of weighted touches, fitting a meta-ellipse to the plurality of weighted touches, and determining an orientation of the hand based on parameters of the meta-ellipse. Additionally or alternatively to one or more examples disclosed above, the method can comprise determining a size of one or more of the plurality of identified touches and a distance between the centroid of the one or more of the plurality of identified touches and a centroid of a nearest neighboring touch from the identified plurality of touches. Additionally or alternatively to one or more examples disclosed above, the method can comprise weighting one or more of the plurality of identified touches inversely to the size of the touch and the distance between the centroid of the touch and the centroid of the nearest neighboring touch. Additionally or alternatively to one or more examples disclosed above, the method can comprise computing a covariance matrix of the plurality of weighted touches; computing eigenvalues of the covariance matrix; and fitting the meta-ellipse to the plurality of weighted touches based on the computed covariance matrix and eigenvalues. Additionally or alternatively to one or more examples disclosed above, the method can comprise determining an orientation of the hand based on the length of the major axis of the meta-ellipse. Additionally or alternatively to one or more examples disclosed above, the method can comprise determining an orientation of the hand based on the length of the minor axis of the meta-ellipse if only two touches are identified. Additionally or alternatively to one or more examples disclosed above, the method can comprise rejecting undesired touches based on the determined orientation.

Other examples of the disclosure are directed to a method for rejecting touches on a touch sensing surface. The method can comprise identifying a plurality of touches from a touch image of one or more objects proximate to the touch sensing surface, weighting the plurality of touches, determining a meta-centroid of the plurality of weighted touches, fitting a meta-ellipse to the plurality of weighted touches; and rejecting touches within the meta-ellipse. Additionally or alternatively to one or more examples disclosed above, the method can comprise determining a minor radius of one or more of the plurality of identified touches and weighting one or more of the plurality of identified touches based on the minor radius of the touch. Additionally or alternatively to one or more examples disclosed above, the method can comprise rejecting touches within a threshold distance of a boundary or meta-centroid of the meta-ellipse. Additionally or alternatively to one or more examples disclosed above, the method can comprise recognizing touches within a threshold distance of a stylus touch, even if the touches are within a threshold distance of the boundary or meta-centroid of the meta-ellipse.

Other examples of the disclosure are directed to a non-transitory computer readable medium, the computer readable medium containing instructions that, when executed, perform a method for determining an orientation a hand proximate to a touch sensing surface. The method can comprise identifying a plurality of touches from a touch image of the hand proximate to the touch sensing surface, weighting the plurality of touches, determining a meta-centroid of the plurality of weighted touches, fitting a meta-ellipse to the plurality of weighted touches, and determining an orientation of the hand based on parameters of the meta-ellipse. Additionally or alternatively to one or more examples disclosed above, the method can comprise determining a size of one or more of the plurality of identified touches and a distance between the centroid of the one or more of the plurality of identified touches and a centroid of a nearest neighboring touch from the identified plurality of touches. Additionally or alternatively to one or more examples disclosed above, the method can comprise weighting one or more of the plurality of identified touches inversely to the size of the touch and the distance between the centroid of the touch and the centroid of the nearest neighboring touch. Additionally or alternatively to one or more examples disclosed above, the method can comprise computing a covariance matrix of the plurality of weighted touches; computing eigenvalues of the covariance matrix; and fitting the meta-ellipse to the plurality of weighted touches based on the computed covariance matrix and eigenvalues. Additionally or alternatively to one or more examples disclosed above, the method can comprise determining an orientation of the hand based on the length of the major axis of the meta-ellipse. Additionally or alternatively to one or more examples disclosed above, the method can comprise determining an orientation of the hand based on the length of the minor axis of the meta-ellipse if only two touches are identified. Additionally or alternatively to one or more examples disclosed above, the method can comprise rejecting undesired touches based on the determined orientation.

Other examples of the disclosure are directed to a non-transitory computer readable medium, the computer readable medium containing instructions that, when executed, perform a method for rejecting touches on a touch sensing surface. The method can comprise identifying a plurality of touches from a touch image of one or more objects proximate to the touch sensing surface, weighting the plurality of touches, determining a meta-centroid of the plurality of weighted touches, fitting a meta-ellipse to the plurality of weighted touches; and rejecting touches within the meta-ellipse. Additionally or alternatively to one or more examples disclosed above, the method can comprise determining a minor radius of one or more of the plurality of identified touches and weighting one or more of the plurality of identified touches based on the minor radius of the touch. Additionally or alternatively to one or more examples disclosed above, the method can comprise rejecting touches within a threshold distance of a boundary or meta-centroid of the meta-ellipse. Additionally or alternatively to one or more examples disclosed above, the method can comprise recognizing touches within a threshold distance of a stylus touch, even if the touches are within a threshold distance of the boundary or meta-centroid of the meta-ellipse.

Other examples of the disclosure are directed to an electronic device. The device can comprise a touch sensing surface and a processor. The processor can be capable of identifying a plurality of touches from a touch image of the hand proximate to the touch sensing surface, weighting the plurality of touches, determining a meta-centroid of the plurality of weighted touches, fitting a meta-ellipse to the plurality of weighted touches, and determining an orientation of the hand based on parameters of the meta-ellipse. Additionally or alternatively to one or more examples disclosed above, the processor can be capable of determining a size of one or more of the plurality of identified touches and a distance between the centroid of the one or more of the plurality of identified touches and a centroid of a nearest neighboring touch from the identified plurality of touches. Additionally or alternatively to one or more examples disclosed above, the processor can be capable of weighting one or more of the plurality of identified touches inversely to the size of the touch and the distance between the centroid of the touch and the centroid of the nearest neighboring touch. Additionally or alternatively to one or more examples disclosed above, the processor can be capable of computing a covariance matrix of the plurality of weighted touches; computing eigenvalues of the covariance matrix; and fitting the meta-ellipse to the plurality of weighted touches based on the computed covariance matrix and eigenvalues. Additionally or alternatively to one or more examples disclosed above, the processor can be capable of determining an orientation of the hand based on the length of the major axis of the ellipse. Additionally or alternatively to one or more examples disclosed above, the processor can be capable of determining an orientation of the hand based on the length of the minor axis of the meta-ellipse if only two touches are identified. Additionally or alternatively to one or more examples disclosed above, the processor can be capable of rejecting undesired touches based on the determined orientation.

Other examples of the disclosure are directed to an electronic device. The device can comprise a touch sensing surface and a processor. The processor can be capable of identifying a plurality of touches from a touch image of one or more objects proximate to the touch sensing surface, weighting the plurality of touches, determining a meta-centroid of the plurality of weighted touches, fitting a meta-ellipse to the plurality of weighted touches; and rejecting touches within the meta-ellipse. Additionally or alternatively to one or more examples disclosed above, the processor can be capable of determining a minor radius of one or more of the plurality of identified touches and weighting one or more of the plurality of identified touches based on the minor radius of the touch. Additionally or alternatively to one or more examples disclosed above, the processor can be capable of rejecting touches within a threshold distance of a boundary or meta-centroid of the meta-ellipse. Additionally or alternatively to one or more examples disclosed above, the processor can be capable of recognizing touches within a threshold distance of a stylus touch, even if the touches are within a threshold distance of the boundary or meta-centroid of the meta-ellipse.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

What is claimed is:

1. An electronic device, comprising:
   a touch sensing surface; and
   a processor coupled to the touch sensing surface, the processor configured to:
   identify a plurality of touches from a touch image of one or more objects proximate to the touch sensing surface, wherein each of the plurality of touches has a first centroid;
   weight the plurality of identified touches;
   determine a second centroid of the plurality of weighted touches;
   define an area around the second centroid of the plurality of weighted touches; and
   reject touches within the area.

2. The electronic device of claim 1, wherein defining the area around the second centroid of the plurality of weighted touches comprises fitting an ellipse around the second centroid to the plurality of weighted touches.

3. The electronic device of claim 1, the processor further configured to:
   determine a minor radius of one or more of the plurality of identified touches and weighting a respective touch of the plurality of identified touches based on a respective minor radius of the respective touch.

4. The electronic device of claim 3, wherein weighting the respective touch of the plurality of identified touches based on the respective minor radius of the respective touch comprises weighting the respective touch by zero when the respective minor radius is below a first respective threshold value.

5. The electronic device of claim 4, wherein weighting the respective touch of the plurality of identified touches based on the respective minor radius of the respective touch weighting the respective touch based on a difference between the respective minor radius and the first respective threshold value.

6. The electronic device of claim 4, wherein the first respective threshold value is elevated when a stylus is detected with respect to the first respective threshold value when the stylus is not detected.

7. The electronic device of claim 4, wherein the first respective threshold value is reduced when the minor radius of the respective touch is above a second respective threshold value with respect to the first respective threshold value when the respective minor radius of the respective touch is below the second respective threshold.

8. The electronic device of claim 1, the processor further configured to:
   reject one or more touches within a threshold distance of a boundary of the area or of the second centroid.

9. The electronic device of claim 8, the processor further configured to:
   recognize one or more touches within a threshold distance of a stylus touch, even when the one or more touches are within the threshold distance of the boundary of the area or of the second centroid.

10. A method for rejecting one or more touches on a touch sensing surface, the method comprising:

identifying a plurality of touches from a touch image of one or more objects proximate to the touch sensing surface, wherein each of the plurality of touches has a first centroid;

weighting the plurality of identified touches;

determining a second centroid of the plurality of weighted touches;

defining an area around the second centroid of the plurality of weighted touches; and rejecting touches within the area.

11. The method of claim 10, wherein defining the area around the second centroid of the plurality of weighted touches comprises fitting an ellipse around the second centroid to the plurality of weighted touches.

12. The method of claim 10, further comprising:
determining a minor radius of one or more of the plurality of identified touches and weighting a respective touch of the plurality of identified touches based on a respective minor radius of the respective touch.

13. The method of claim 12, wherein weighting the respective touch of the plurality of identified touches based on the respective minor radius of the respective touch comprises weighting the respective touch by zero when the respective minor radius is below a first respective threshold value.

14. The method of claim 13, wherein weighting the respective touch of the plurality of identified touches based on the respective minor radius of the respective touch weighting the respective touch based on a difference between the respective minor radius and the first respective threshold value.

15. The method of claim 10, further comprising:
rejecting one or more touches within a threshold distance of a boundary of the area or of the second centroid.

16. The method of claim 15, further comprising:
recognizing one or more touches within a threshold distance of a stylus touch, even when the touches are within the threshold distance of the boundary of the area or of the second centroid.

17. The method of claim 13, wherein the first respective threshold value is elevated when a stylus is detected with respect to the first respective threshold value when the stylus is not detected.

18. The electronic device of claim 13, wherein the first respective threshold value is reduced when the minor radius of the respective touch is above a second respective threshold value with respect to the first respective threshold value when the respective minor radius of the respective touch is below the second respective threshold.

19. A non-transitory computer readable medium, the computer readable medium including instructions that, when executed by one or more processors, perform a method for rejecting touches on a touch sensing surface, the method comprising:

identifying a plurality of touches from a touch image of one or more objects proximate to the touch sensing surface, wherein each of the plurality of touches has a first centroid;

weighting the plurality of identified touches;

determining a second centroid of the plurality of weighted touches;

defining an area around the second centroid of the plurality of weighted touches; and rejecting touches within the area.

20. The non-transitory computer readable medium of claim 19, wherein defining the area around the second centroid of the plurality of weighted touches comprises fitting an ellipse around the second centroid to the plurality of weighted touches.

21. The non-transitory computer readable medium of claim 19, further comprising:
determining a minor radius of one or more of the plurality of identified touches and weighting a respective touch of the plurality of identified touches based on a respective minor radius of the respective touch.

22. The non-transitory computer readable medium of claim 21, wherein weighting the respective touch of the plurality of identified touches based on the respective minor radius of the respective touch comprises weighting the respective touch by zero when the respective minor radius is below a first respective threshold value.

23. The non-transitory computer readable medium of claim 22, wherein weighting the respective touch of the plurality of identified touches based on the respective minor radius of the respective touch weighting the respective touch based on a difference between the respective minor radius and the first respective threshold value.

24. The non-transitory computer readable medium of claim 22, wherein the first respective threshold value is elevated when a stylus is detected with respect to the first respective threshold value when the stylus is not detected.

25. The non-transitory computer readable medium of claim 22, wherein the first respective threshold value is reduced when the minor radius of the respective touch is above a second respective threshold value with respect to the first respective threshold value when the respective minor radius of the respective touch is below the second respective threshold.

26. The non-transitory computer readable medium of claim 19, further comprising:
rejecting one or more touches within a threshold distance of a boundary of the area or of the second centroid.

27. The non-transitory computer readable medium of claim 26, further comprising:
recognizing one or more touches within a threshold distance of a stylus touch, even when the one or more touches are within the threshold distance of the boundary of the area or of the second centroid.

* * * * *